United States Patent
Terada et al.

(10) Patent No.: US 10,745,053 B2
(45) Date of Patent: Aug. 18, 2020

(54) VEHICLE BODY UPPER SECTION STRUCTURE

(71) Applicant: TOYOTA JIDOSHA KABUSHIKI KAISHA, Toyota-shi, Aichi-ken (JP)

(72) Inventors: Shin Terada, Toyota (JP); Hiroyuki Kurokawa, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 168 days.

(21) Appl. No.: 16/013,286

(22) Filed: Jun. 20, 2018

(65) Prior Publication Data
US 2019/0047627 A1 Feb. 14, 2019

(30) Foreign Application Priority Data

Aug. 14, 2017 (JP) ................. 2017-156685

(51) Int. Cl.
*B62D 21/15* (2006.01)
*B62D 25/06* (2006.01)
*B60R 13/02* (2006.01)
*B62D 27/02* (2006.01)
*B62D 25/02* (2006.01)

(52) U.S. Cl.
CPC .......... *B62D 21/157* (2013.01); *B60R 13/025* (2013.01); *B62D 25/02* (2013.01); *B62D 25/06* (2013.01); *B62D 27/023* (2013.01)

(58) Field of Classification Search
CPC ...... B62D 21/157; B62D 25/06; B62D 25/02; B62D 27/023; B60R 13/025

USPC ................................... 296/203.03
See application file for complete search history.

(56) References Cited

U.S. PATENT DOCUMENTS 8,915,540 B2 * 12/2014 Nishimura ............ B62D 25/06
                   296/210
2018/0237074 A1* 8/2018 Yoshitake ............ B62D 25/02

FOREIGN PATENT DOCUMENTS

| JP | 2007-083830 A | 4/2007 |
| JP | 2010-023692 A | 2/2010 |
| JP | 2015-033956 A | 2/2015 |

* cited by examiner

*Primary Examiner* — Joseph D. Pape
*Assistant Examiner* — Dana D Ivey
(74) *Attorney, Agent, or Firm* — Oliff PLC

(57) ABSTRACT

There is provided a vehicle body upper section structure including: a pair of roof side rails that are spaced apart in a vehicle width direction and that extend along a vehicle front-rear direction; a roof reinforcement that extends along the vehicle width direction between the pair of roof side rails; extensions that each join a vehicle vertical direction lower side of a respective one of the pair of roof side rails to a respective vehicle width direction inward side of the roof reinforcement; and a beaded section that is provided at each extension, the beaded section projecting toward a lower side in the vehicle vertical direction and extending in the vehicle width direction such that a projection depth of the beaded section toward the lower side becomes deeper on progression from an inner side toward an outer side in the vehicle width direction.

8 Claims, 9 Drawing Sheets

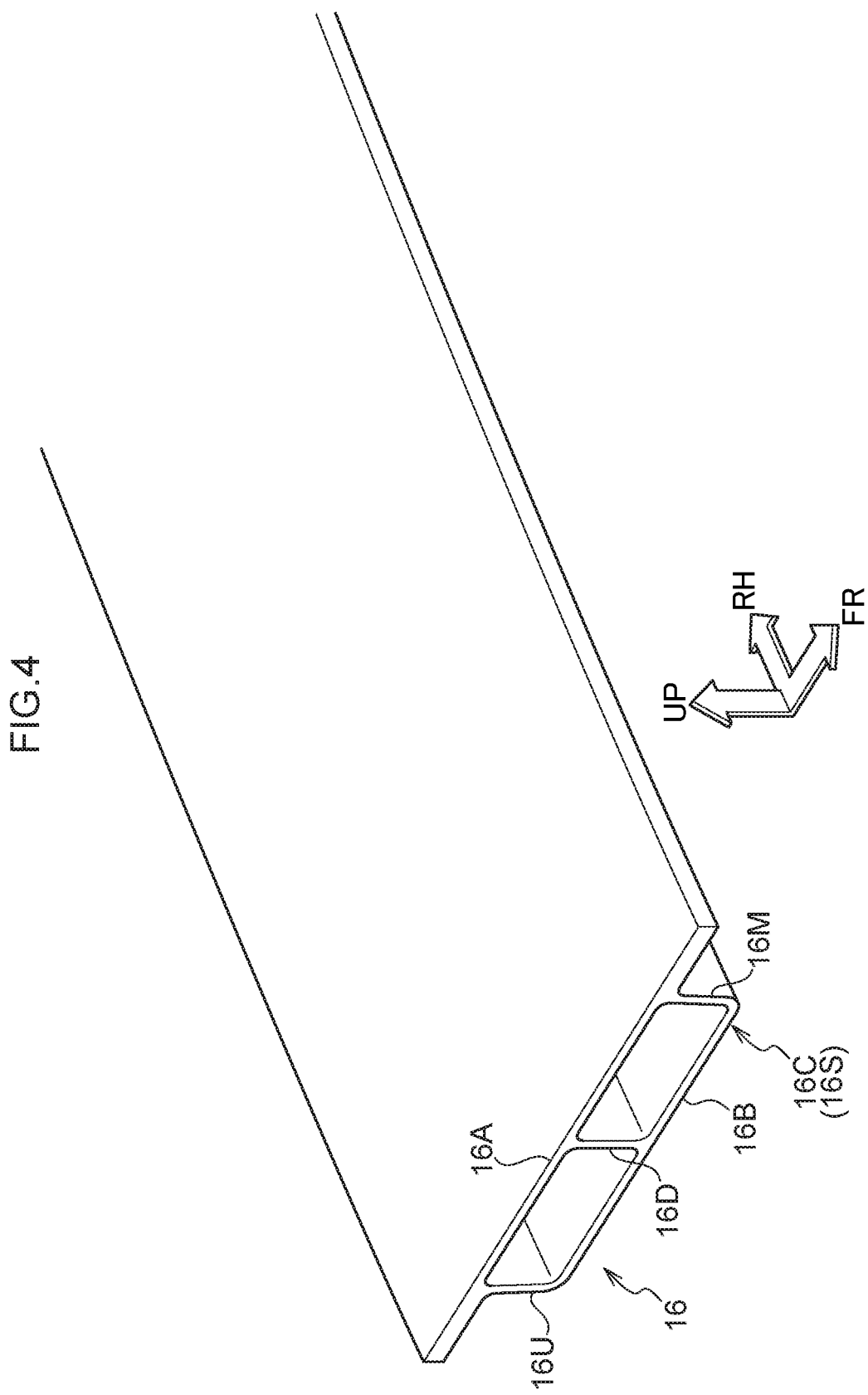

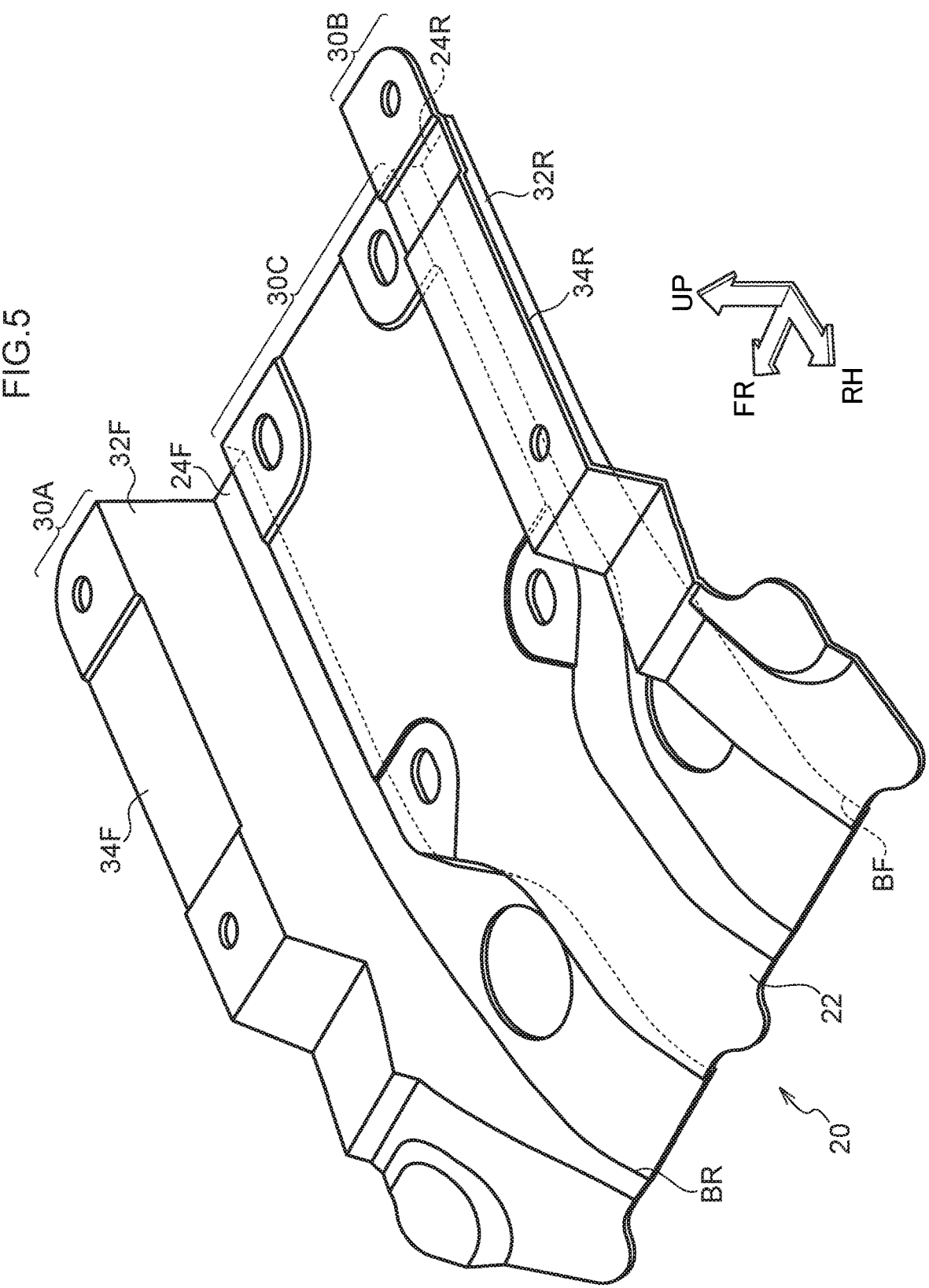

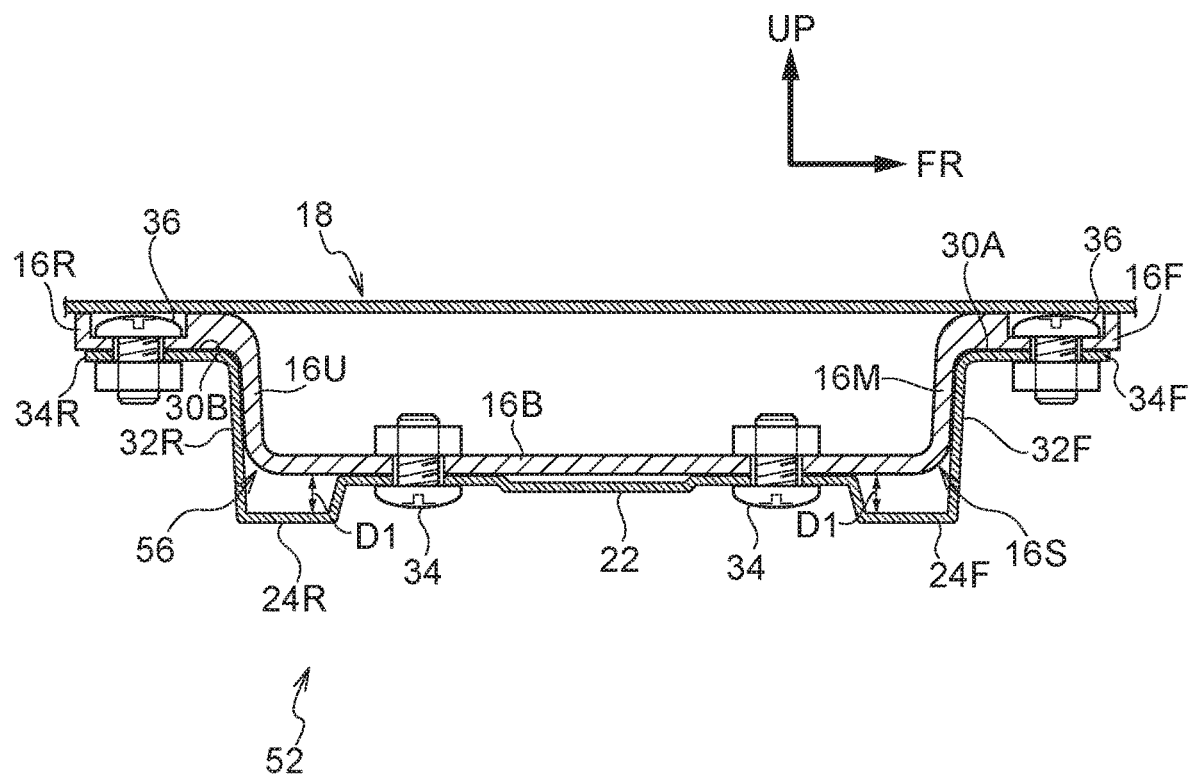

VEHICLE BODY UPPER SECTION STRUCTURE

CROSS-REFERENCE TO RELATED APPLICATION

This application is based on and claims priority under 35 USC 119 from Japanese Patent Application No. 2017-156685 filed on Aug. 14, 2017, the disclosure of which is incorporated by reference herein.

BACKGROUND

Technical Field

The present disclosure relates to a vehicle body upper section structure.

Related Art

Japanese Patent Application Laid-Open (JP-A) No. 2010-23692 discloses an automobile roof structure that includes extension portions for coupling a pair of roof side rails together. These extension portions extend outwardly in a vehicle width direction from the center of end portions of a roof reinforcement to which they are attached. In the structure of JP-A 2010-23692, the extension portions are formed with upright walls bending downward below rail flanges that project to the inner side of the roof side rails, and connection portions that extend downward from the upright walls are coupled to roof side rail inners via a bent portion.

In a vehicle side-on collision, the end portions of the roof reinforcement make contact with the edges of roof side rail flanges, and the upright walls of the roof reinforcement make contact with underside faces of the roof side rail inners.

It is desirable to increase the join strength of portions in a vehicle body upper section structure where a roof reinforcement is joined to a roof side rail (referred to simply as "join portion" below). For example, in cases in which a cross-section profile of the roof reinforcement taken along a vehicle front-rear direction is uniform across a vehicle width direction regardless of position, load acting on the roof reinforcement may not be completely absorbed by deformation of the roof reinforcement or the like, and will thus act on the join portion.

SUMMARY

The present disclosure provides to raise the join strength of a join portion where a roof reinforcement is joined to a roof side rail.

In a first aspect, a vehicle body upper section structure includes a pair of roof side rails, a roof reinforcement, and extensions. The pair of roof side rails are disposed spaced apart in a vehicle width direction and extend along a vehicle front-rear direction. The roof reinforcement extends along the vehicle width direction between the pair of roof side rails. The extensions each join a vehicle vertical direction lower side of a respective one of the pair of roof side rails to a respective vehicle width direction inward side of the roof reinforcement. A beaded section is provided at each extension. The beaded section projects toward a lower side in the vehicle vertical direction and extends in the vehicle width direction such that a projection depth of the beaded section toward the lower side becomes deeper on progression from an inner side toward an outer side in the vehicle width direction.

In this vehicle body upper section structure, the lower sides of the pair of roof side rails are joined by the extensions to the respective vehicle width direction inward side of the roof reinforcement.

Each extension is provided with a beaded section projecting toward the lower side in the vehicle vertical direction. The beaded section extends in the vehicle width direction. The beaded section raises the flexural rigidity of the extensions in the vehicle width direction. In particular, since the projection depth of the beaded section toward the lower side becomes deeper on progression from the inner side toward the outer side in the vehicle width direction, the flexural rigidity of the extensions is also raised on progression from the inner side toward the outer side in the vehicle width direction. Bending of the respective extension is thereby effectively suppressed even when a bending moment acts on the extension, enabling suppression of a reduction in the strength with which each extension is joined to the roof reinforcement. The join strength of a join portion where the roof reinforcement is joined to the respective roof side rail is also raised.

A second aspect is the first aspect, wherein a location on the beaded section at an inner side in the vehicle width direction overlaps with the roof reinforcement as viewed along the vehicle vertical direction.

The portion of each extension with high flexural rigidity overlaps with the roof reinforcement, enabling a structure to be achieved in which no portions with weak local flexural rigidity are present between the roof reinforcement and each extension.

A third aspect is the first aspect or the second aspect, wherein the roof reinforcement includes a framework member that extends in the vehicle width direction, and the location of the beaded section at the inner side in the vehicle width direction overlaps with the framework member as viewed along the vehicle vertical direction.

The framework member extends in the vehicle width direction at the roof reinforcement, thereby raising the flexural rigidity of the roof reinforcement in the vehicle width direction. Since the location of the beaded section at the vehicle width direction inner side overlaps with the framework member as viewed along the vehicle vertical direction, load from the roof reinforcement to the roof side rails is able to be smoothly transmitted via the extensions.

A fourth aspect is any one of the first aspect to the third aspect, wherein the beaded section includes a front bead positioned toward the front in the vehicle front-rear direction, and a rear bead positioned toward the rear in the vehicle front-rear direction.

Each extension has increased flexural rigidity at the vehicle front side due to the front bead and increased flexural rigidity at the vehicle rear side due to the rear bead. Namely, the flexural rigidity of each extension is able to be raised at both the vehicle front side and the vehicle rear side thereof.

A fifth aspect is the fourth aspect, wherein each extension includes an adhering portion for adhering the extension to the roof reinforcement at a location in front of the front bead in the vehicle front-rear direction, at a location to the rear of the rear bead in the vehicle front-rear direction, and at a location between the front bead and the rear bead in the vehicle front-rear direction.

The respective adhering portions are located in front of the front bead, located to the rear of the rear bead, and located between the front bead and the rear bead. This enables a wide overall area to be ensured for the adhering portions, which contributes to improved adhesive strength between the extensions and the roof reinforcement.

A sixth aspect is any one of the first aspect to the fifth aspect, wherein the roof reinforcement has a linear profile in the vehicle width direction, and a cross-section profile of the roof reinforcement taken along the vehicle front-rear direction is uniform across the vehicle width direction regardless of position.

Configuring the roof reinforcement with a linear profile in the vehicle width direction enables the shape of the roof reinforcement to be simplified. Further, since the cross-section profile of the roof reinforcement taken along the vehicle front-rear direction is uniform across the vehicle width direction regardless of position, the roof reinforcement can achieve a structure in which no locations with weak local flexural rigidity are present at any vehicle width direction position. This enables bending of the extensions to be suppressed even when load acts on the extensions from such a roof reinforcement.

A seventh aspect is any one of the first aspect to the sixth aspect, wherein the roof reinforcement includes a closed cross-section profile section that has a rectangular shape in a cross-section taken along the vehicle front-rear direction.

Since the cross-section profile of the roof reinforcement has a closed rectangular profile, as taken along the vehicle front-rear direction, the flexural rigidity of the roof reinforcement is higher than that of structures in which the roof reinforcement has an open cross-section profile.

An eighth aspect is the seventh aspect, wherein a reinforcement piece is provided within the closed cross-section profile section, the reinforcement piece extending in the vehicle width direction and spanning between an upper wall and a lower wall of the closed cross-section profile section.

The reinforcement piece enables a structure to be achieved in which the roof reinforcement has even higher flexural rigidity.

A ninth aspect is any one of the first aspect to the sixth aspect, wherein a cross-section profile of the roof reinforcement taken along the vehicle front-rear direction has an open cross-section profile that opens toward the upper side in the vehicle vertical direction, and a roof panel that closes off the open cross-section profile is provided at the upper side of the roof reinforcement in the vehicle vertical direction.

The roof reinforcement has an open cross-section profile that opens toward the upper side, and the weight of the roof reinforcement can be reduced due to not needing an upper wall.

The present disclosure enables the join strength of a join portion where a roof reinforcement is joined to a roof side rail to be raised.

BRIEF DESCRIPTION OF THE DRAWINGS

Exemplary embodiments of the present disclosure will be described in detail based on the following figures, wherein:

FIG. 4 is a perspective view partially illustrating a roof reinforcement of a vehicle body upper section structure of the first exemplary embodiment;

FIG. 5 is a perspective view illustrating an extension of a vehicle body upper section structure of the first exemplary embodiment;

FIG. 7 is a cross-section illustrating a vehicle body upper section structure of a third exemplary embodiment at a similar cross-sectional position to FIG. 3A.

DETAILED DESCRIPTION

Figure 1:
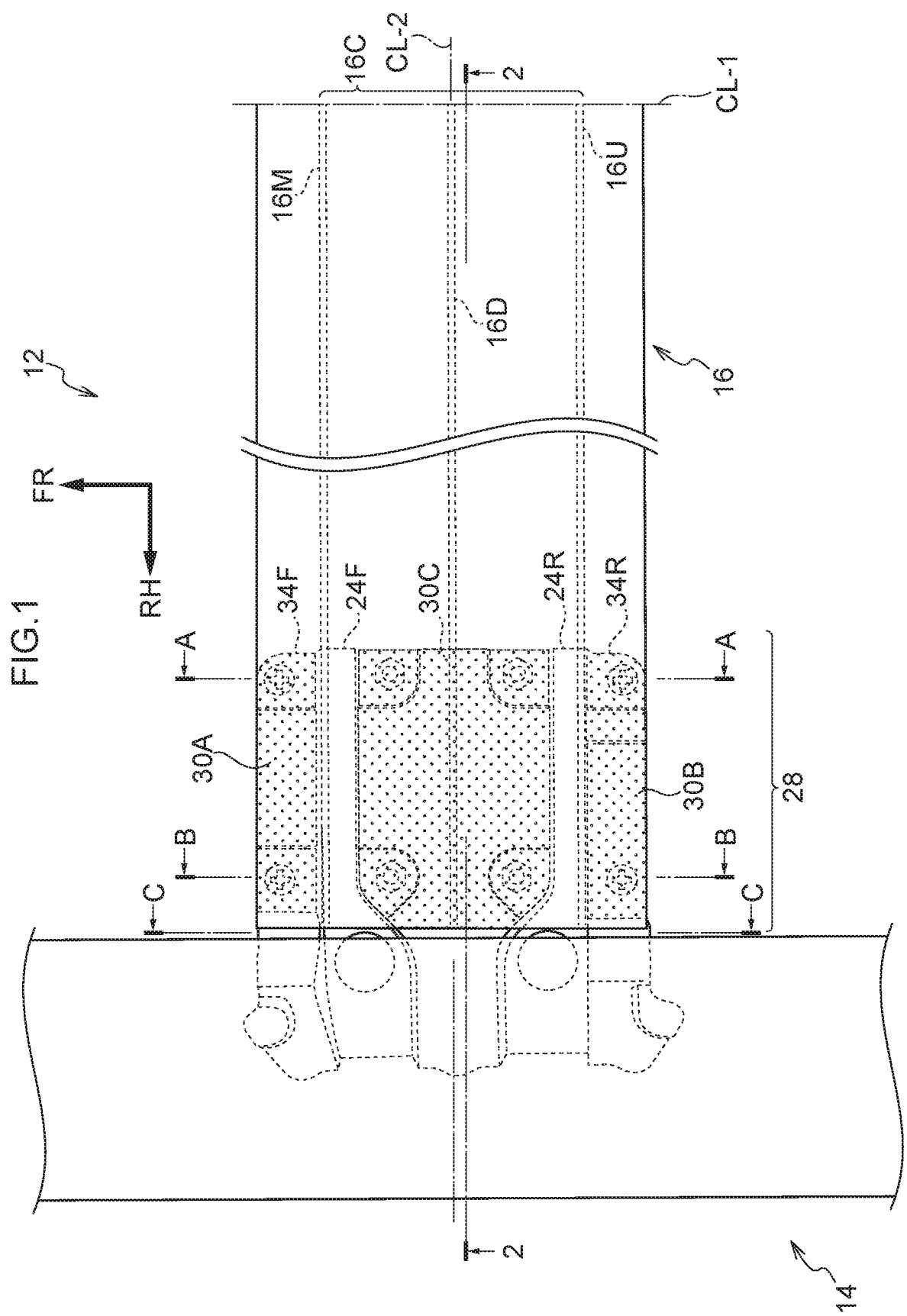
FIG. 1 is an enlarged plan view partially illustrating a vehicle body upper section structure of a first exemplary embodiment.

Explanation follows regarding a vehicle body upper section structure 12 of a first exemplary embodiment of the present disclosure, with reference to the drawings. In the drawings, the vehicle front side, the vehicle upper side, and the vehicle width direction right side are respectively indicated by the arrow FR, the arrow UP, and the arrow RH. Further, in the following, simple reference to the "front" or "rear" means the front or the rear in a vehicle front-rear direction, and reference to the "upper side" or "lower side" means the upper side or the lower side in a vehicle vertical direction.

Figure 2:
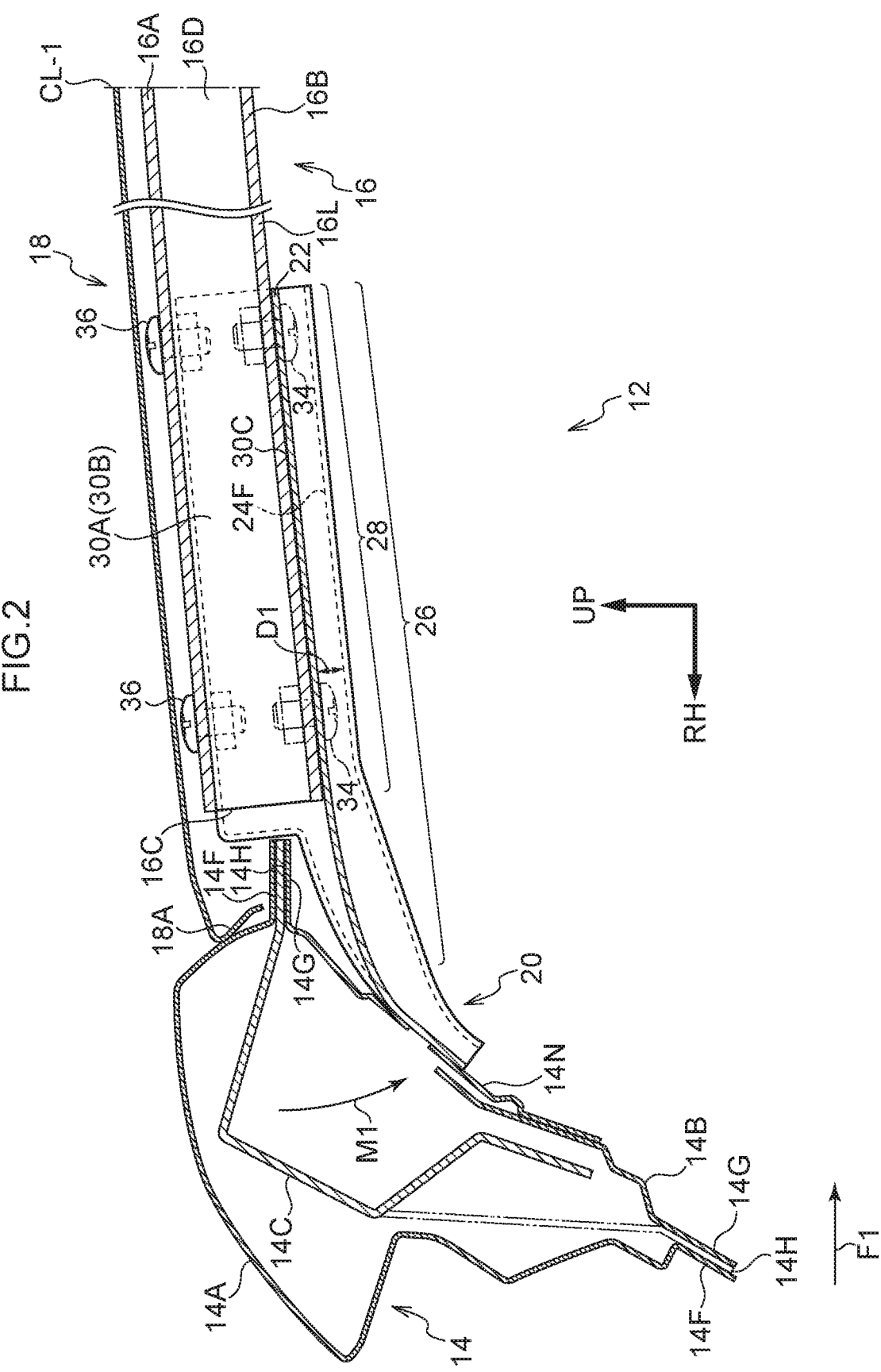
FIG. 2 is an enlarged cross-section taken along line 2-2 in FIG. 1 partially illustrating a vehicle body upper section structure of the first exemplary embodiment.

As illustrated in FIG. 1 and FIG. 2, the vehicle body upper section structure 12 includes a left-right pair of roof side rails 14 that are disposed spaced apart in the vehicle width direction. Although only a vehicle width direction right-side section is illustrated in FIG. 1 and FIG. 2, the vehicle width direction left-side section has vehicle width direction symmetry with the vehicle width direction right-side section about a center line CL-1.

In the present exemplary embodiment, as illustrated in FIG. 2, each roof side rail 14 includes an outer rail 14A disposed on the upper side and vehicle width direction outer side of the roof side rail 14, and an inner rail 14B disposed on the lower side and vehicle width direction inner side of the each roof side rail 14.

The outer rail 14A has a cross-section profile that opens toward the lower side and the vehicle width direction inner side. The inner rail 14B has a cross-section profile that opens toward the upper side and the vehicle width direction outer side. Respective flanges 14F, 14G are joined sandwiching a flange 14H of a reinforcement rail 14C, described later. Each roof side rail 14 is thus configured with a closed cross-section profile in the vehicle width direction and extending along the vehicle front-rear direction.

A pillar, not illustrated, is joined to the lower side of each roof side rail 14. For example a center pillar (B pillar) is joined to the lower side of each roof side rail 14 at a substantially central position in the vehicle front-rear direction.

The reinforcement rails 14C are disposed inside the roof side rails 14. Each reinforcement rail 14C has a cross-section profile that opens toward the lower side and the vehicle width direction inner side. The flange 14H of each reinforcement rail 14C is sandwiched between the respective flanges 14F, 14Q such that the reinforcement rail 14C is fixed to the respective outer rail 14A and inner rail 14B. The roof side rails 14 are thus reinforced by the reinforcement rails 14C.

A roof reinforcement 16 that extends along the vehicle width direction is disposed between the left-right pair of roof side rails 14. As illustrated in detail in FIG. 3A, FIG. 3B, and FIG. 4, as seen in cross-section taken along the vehicle front-rear direction, the roof reinforcement 16 includes a rectangularly-shaped closed cross-section profile section 16C bounded by an upper wall 16A, a lower wall 16B, a front wall 16M, and a rear wall 16U. The roof reinforcement 16 also includes flanges 16F, 16R that respectively extend toward the front and the rear from the upper wall 16A of the closed cross-section profile section 16C.

The closed cross-section profile section 16C extends along the vehicle width direction, and the cross-section profile of the closed cross-section profile section 16C is uniform across the vehicle width direction regardless of position. Due to having such a closed cross-section profile section 16C, the flexural rigidity of the roof reinforcement 16 in the vehicle width direction is higher than that of structures that do not have such a closed cross-section profile section 16C. The closed cross-section profile section 16C is an example of a framework member 16S in the roof reinforcement 16.

In the present exemplary embodiment, a reinforcement piece 16D is provided within the closed cross-section profile section 16C. The reinforcement piece 16D is positioned at the vehicle front-rear direction center of the closed cross-section profile section 16C, and is provided running in the vehicle vertical direction spanning between the upper wall 16A and the lower wall 16B in the closed cross-section profile section 16C. The roof reinforcement 16 is reinforced by the reinforcement piece 16D. In particular, the reinforcement piece 16D raises the flexural rigidity of the roof reinforcement 16 in the vehicle width direction compared to structures not provided therewith.

The reinforcement piece 16D extends along the vehicle width direction within the closed cross-section profile section 16C, and including the reinforcement piece 16D, the cross-section profile of the closed cross-section profile section 16C is uniform across the vehicle width direction regardless of position.

Figure 3A:
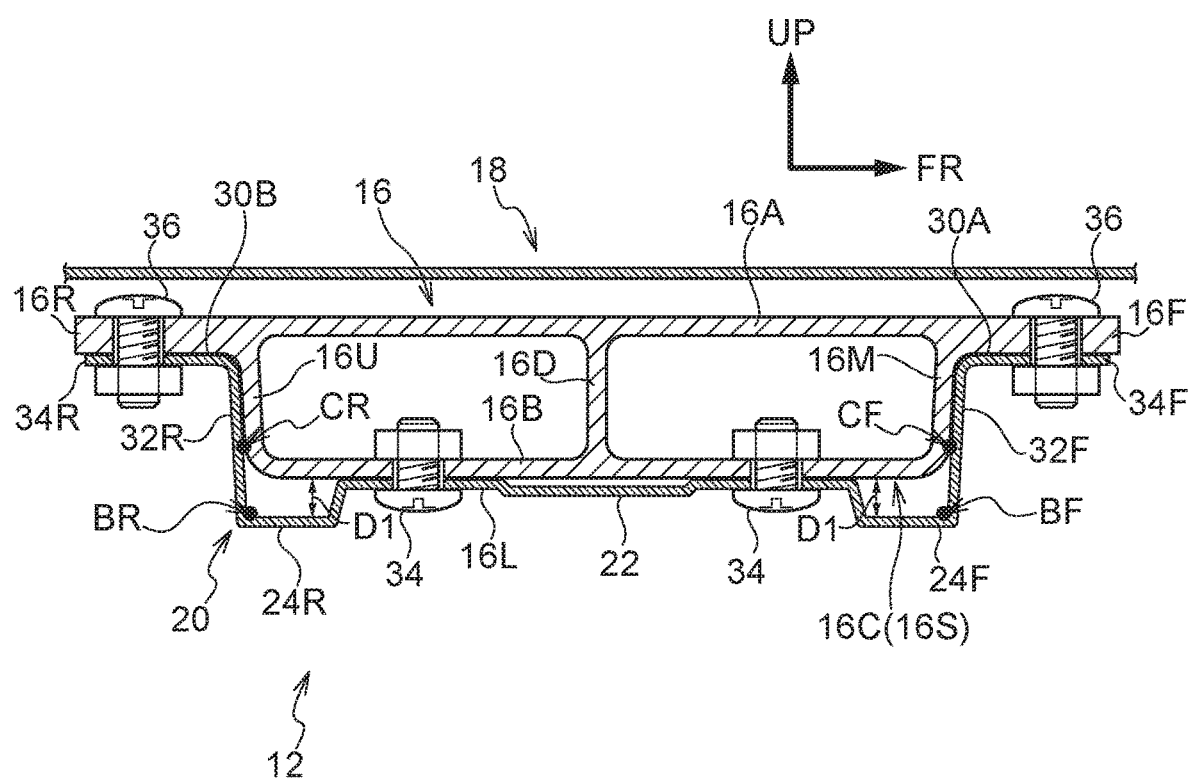
FIG. 3A is a cross-section taken along line A-A in FIG. 1 illustrating a vehicle body upper section structure of the first exemplary embodiment.
Figure 3B:
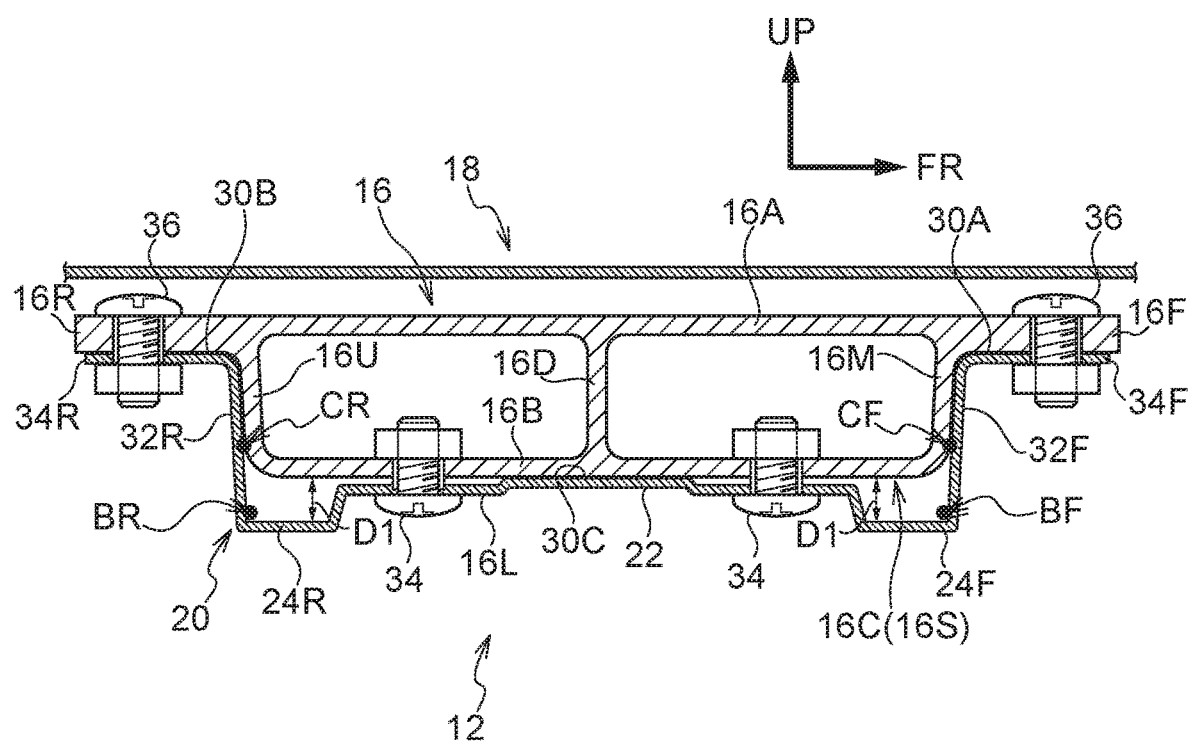
FIG. 3B is a cross-section taken along line B-B in FIG. 1 illustrating a vehicle body upper section structure of the first exemplary embodiment.
Figure 3C:
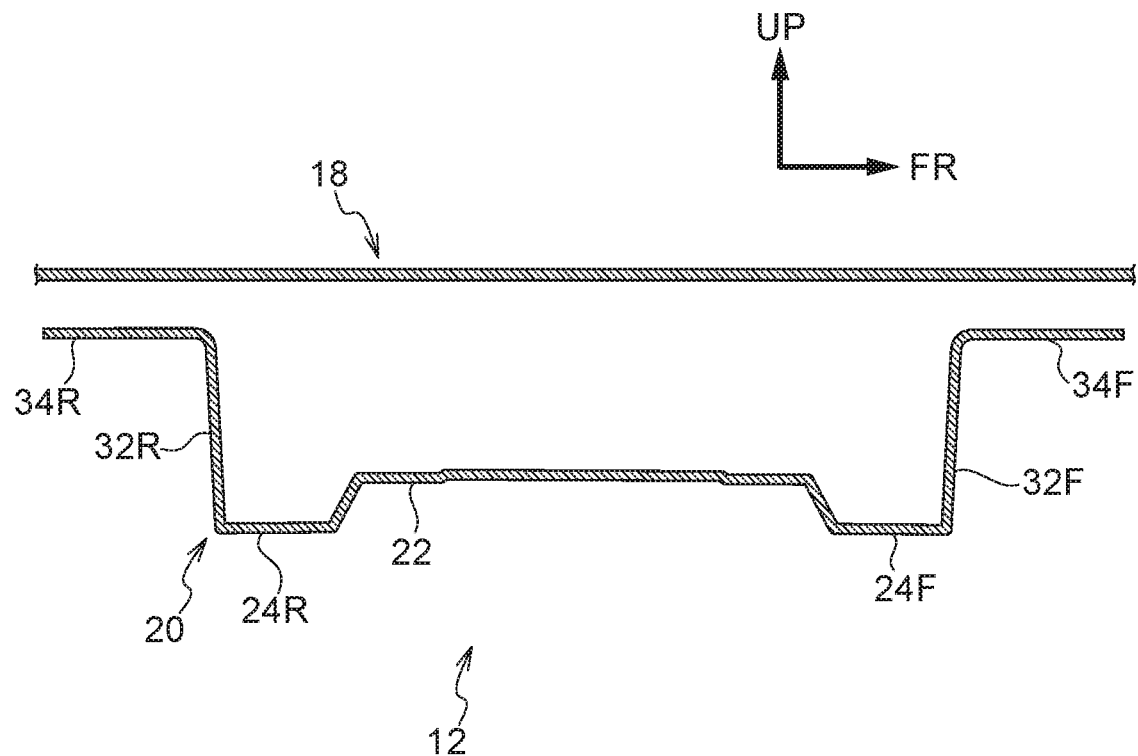
FIG. 3C is a cross-section taken along line C-C in FIG. 1 illustrating a vehicle body upper section structure of the first exemplary embodiment.

As illustrated in FIG. 2, FIG. 3A, and FIG. 3B, a roof panel 18 is disposed on the upper side of the roof reinforcement 16. Each vehicle width direction end of the roof panel 18 is provided with a joining portion 18A. The joining portions 18A are joined to the respective outer rail 14A so as to be fixed in place.

As illustrated in FIG. 2, a vehicle width direction inner face 14N of each roof side rail 14 and a vehicle vertical direction lower face 16L of the roof reinforcement 16 are joined by an extension 20.

As illustrated in detail in FIG. 5, each extension 20 includes a standard portion 22 that curves smoothly from the lower face 16L of the roof reinforcement 16 to the inner face 14N of the roof side rail 14 so as to contact both the lower face 16L and the inner face 14N.

A front bead 24F and a rear bead 24R are respectively provided at the front and rear of the standard portion 22. The front bead 24F and the rear bead 24R are formed in the plate member configuring the standard portion 22, and are formed so as to project to a predetermined projection depth D1 toward the lower side. As illustrated in FIG. 1, the front bead 24F and the rear bead 24R are formed with substantial vehicle front-rear direction symmetry to each other about a center line CL-2 of the extension 20.

The projection depth D1 of the front bead 24F and the rear bead 24R toward the lower side is, at all vehicle width direction locations on the standard portion 22, a length toward the lower side that projects in a direction normal to the standard portion 22. The front bead 24F and the rear bead 24R each include a portion where the projection depth D1 deepens on progression from inner side toward the outer side in the vehicle width direction (a gradually deepening portion 26).

In particular, in the present exemplary embodiment, the gradually deepening portions 26 are set at portions where an adhering portion 30C, described below, is provided in the vehicle width direction.

An overlap section 28 is configured at vehicle width direction inner side portions of the front bead 24F and the rear bead 24R that overlap with the roof reinforcement 16 as viewed along the vehicle vertical direction, for example, where the front bead 24F and the rear bead 24R are set with the gradually deepening portions 26.

In particular, in the present exemplary embodiment, the overlap section 28 overlaps with the closed cross-section profile section 16C (framework member 16S) of the roof reinforcement 16 as viewed along the vehicle vertical direction.

A front wall portion 32F is provided to the extension 20 even more toward the front than the front bead 24F, and a rear wall portion 32R is provided to the extension 20 even more toward the rear than the rear bead 24R. Flanges 34F, 34R extend toward the front and rear from respective upper ends of the front wall portion 32F and the rear wall portion 32R above the standard portion 22.

As illustrated in FIG. 3A and FIG. 3B, a front bead ridgeline BF, this being a ridgeline at the front and lower side of the front bead 24F, overlaps with a closed cross-section profile section front ridgeline CF, this being a ridgeline at the front and lower side of the closed cross-section profile section 16C of the roof reinforcement 16, as viewed along the vehicle vertical direction.

Similarly, a rear bead ridgeline BR, this being a ridgeline at the rear and lower side of the rear bead 24R, overlaps with a closed cross-section profile section rear ridgeline CR, this being a ridgeline at the rear and lower side of the closed cross-section profile section 16C of the roof reinforcement 16, as viewed along the vehicle vertical direction.

As illustrated in FIG. 1, the portion of the standard portion 22 between the front bead 24F and the rear bead 24R also serves as the adhering portion 30C. The adhering portion 30C is a portion that is adhered to the lower wall 16B of the roof reinforcement 16 using an adhesive agent. Note that in FIG. 1, the adhering portion 30C is illustrated using fine dots.

Adhering portions 30A, 30B are also provided to the flanges 34F, 34R. The adhering portions 30A, 30B are portions that are adhered to the respective flanges 16F, 16R of the roof reinforcement 16 using an adhesive agent. In FIG. 1, the adhering portions 30A, 30B are illustrated using fine dots similarly to the adhering portion 30C.

The present exemplary embodiment is thus structured including the adhering portions 30A, 30B and the adhering portion 30C at a location to the front of the front bead 24F, a location to the rear of the rear bead 24R, and a location between the front bead 24F and the rear bead 24R, respectively. Namely, each extension 20 is adhered to the roof reinforcement 16 at a total of three places: at the adhering portions 30A, 30B, and 30C.

As illustrated in FIG. 2, the adhering portions 30A, 30B are positioned more toward the upper side than the adhering portion 30C. Namely, the vehicle body upper section structure 12 is structured including plural adhering portions at different positions in the vehicle vertical direction.

In addition to the adhesive agent mentioned above, each extension 20 is also fixed to the lower wall 16B of the roof reinforcement 16 at the standard portion 22 by bolts 34.

Further, in addition to the adhesive agent mentioned above, the flanges of each extension 20 are fixed to the respective flanges 16F, 16R of the roof reinforcement 16 by bolts 36. The standard portion 22 of each extension 20 is also fixed to the inner rail 14B of the respective roof side rail 14 by an adhesive agent and bolts.

Explanation now follows regarding operation of the first exemplary embodiment.

As illustrated in FIG. 2, in the vehicle body upper section structure 12, during a vehicle side-on collision, for example, load F1 from the outer side toward the inner side in the vehicle width direction may act on the vehicle body at the non-illustrated pillar, namely at the lower side of the roof side rail 14. The roof reinforcement 16 is positioned along the vehicle width direction at the upper side of the position where the load F1 acts. Accordingly, as illustrated using the arrow M1 in FIG. 2, a rotational moment may be generated in the vehicle body upper section structure 12.

In the present exemplary embodiment, the extension 20 is provided with the front bead 24F and the rear bead 24R. The front bead 24F and the rear bead 24R raise the flexural rigidity of the extension 20 in the vehicle width direction. Bending of the extension 20 is thereby suppressed even when the rotational moment M1 acts on the extension 20 from the vehicle width direction outer side. A reduction in the join strength of the extension 20 to the roof reinforcement 16 can be thus be suppressed since the extension 20 is able to maintain a state adhered to the roof reinforcement 16 through the adhering portions 30A, 30B, 30C. The join strength of the vehicle body upper section structure 12, namely the join strength of the join portion where the roof reinforcement 16 is joined to the roof side rail 14, is also raised thereby.

Moreover, in the present exemplary embodiment, since bending of the extension 20 is suppressed, there is no need to increase the plate thickness of the extension 20 or to introduce additional members. This enables bending of the extension 20 to be suppressed while also suppressing an increase in the weight of the extension 20.

The load F1 that acts on the non-illustrated pillar from the outer side toward the inner side in the vehicle width direction during a vehicle side-on collision may also act on the extension 20 through the roof side rail 14 as translational force from the outer side toward the inner side in the vehicle width direction. However, the front bead 24F and the rear bead 24R provided to the extension 20 enable bending of the extension 20 to be suppressed even when acted upon by such translational force.

In particular, in the present exemplary embodiment, the front bead 24F and the rear bead 24R are each provided including the gradually deepening portion 26 where the projection depth D1 deepens on progression from the inner side toward the outer side in the vehicle width direction. Namely, the extension 20 has a larger profile at the vehicle width direction outer side, this being a position closer to a location where load acts in a side collision. The flexural rigidity of the extension 20 thus increases on progression from the inner side toward the outer side in the vehicle width direction, enabling bending of the extension 20 to be effectively suppressed.

Moreover, in the present exemplary embodiment, the front bead 24F and the rear bead 24R include the overlap section 28. The overlap section 28 overlaps with the roof reinforcement 16 as viewed along the vehicle vertical direction. Namely, the portion of the extension 20 with improved flexural rigidity reaches, and is joined to, the roof reinforcement 16, and no portions with weak local flexural rigidity are present between the roof reinforcement 16 and the extension 20. This enables bending of the extension 20 to be even more effectively suppressed.

In the present exemplary embodiment, the roof reinforcement 16 also includes the closed cross-section profile section 16C. The closed cross-section profile section 16C is an example of a framework member 16S. The closed cross-section profile section 16C raises the flexural rigidity of the roof reinforcement 16. The overlap section 28 of the front bead 24F and the rear bead 24R in the extension 20 overlaps with the closed cross-section profile section 16C (framework member 16S) of the roof reinforcement 16. Thus, since deformation of the extension 20 and the roof reinforcement 16 is suppressed when load is transmitted from the roof side rail 14 to the roof reinforcement 16 via the extension 20, the load is able to be smoothly transmitted.

Explanation follows regarding a second exemplary embodiment. In the second exemplary embodiment, elements and members similar to those in the first exemplary embodiment are appended with the same reference signs, and detailed explanation thereof is omitted.

Figure 6:
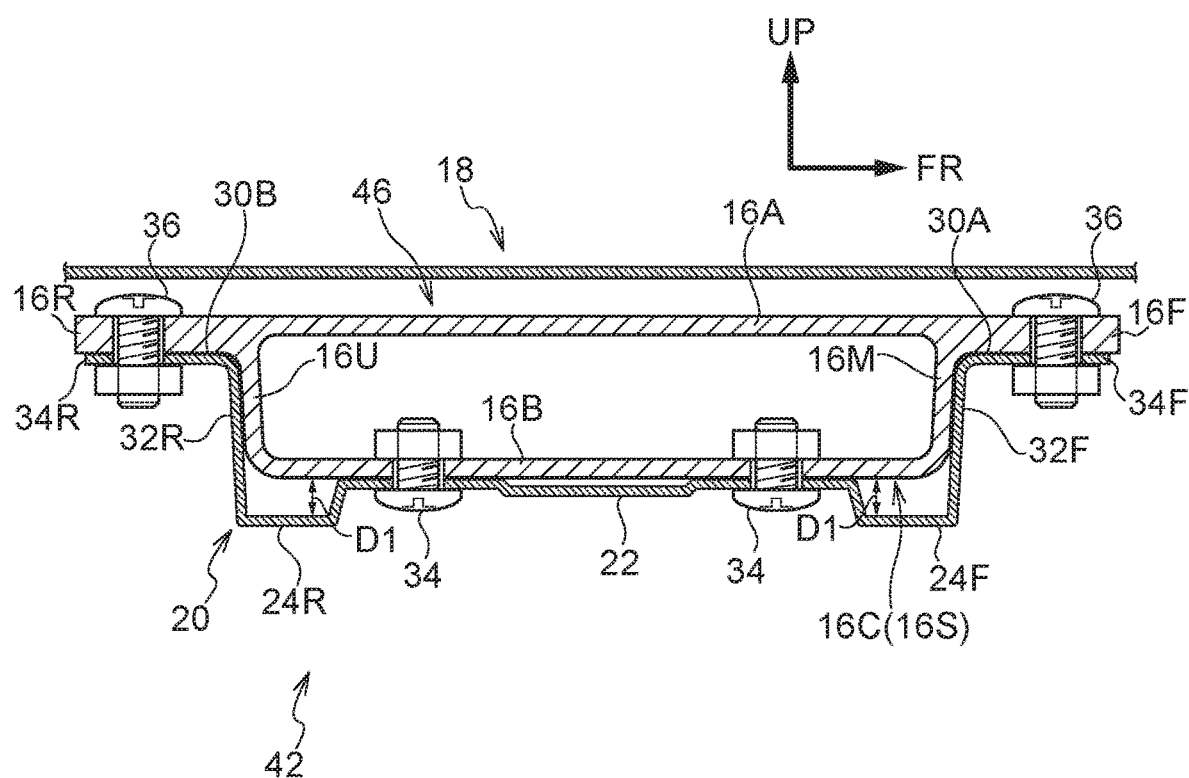
FIG. 6 is a cross-section illustrating a vehicle body upper section structure of a second exemplary embodiment at a similar cross-sectional position to FIG. 3A.

As illustrated in FIG. 6, in a vehicle body upper section structure 42 of the second exemplary embodiment, a member corresponding to the reinforcement piece 16D of the first exemplary embodiment (see FIG. 3A) is not provided within a closed cross-section profile section 16C of a roof reinforcement 46.

In such manner, so long as the closed cross-section profile section 16C is able to maintain a predetermined rigidity, the roof reinforcement 46 may be structured without a reinforcement piece 16D. Not having a reinforcement piece 16D enables the weight of the roof reinforcement 46 to be reduced.

Explanation follows regarding a third exemplary embodiment. In the third exemplary embodiment, elements and members similar to those in the first exemplary embodiment are appended with the same reference signs, and detailed explanation thereof is omitted.

As illustrated in FIG. 7, in a vehicle body upper section structure 52 of the third exemplary embodiment, a roof reinforcement 56 is not provided with an upper wall 16A (see FIG. 3A). Namely, in the third exemplary embodiment, although the roof reinforcement 56 by itself is not configured with a closed cross-section profile section 16C (see FIG. 3A), a framework member 16S is still configured by a lower wall 16B, a front wall 16M, and a rear wall 16U.

Further, in the third exemplary embodiment, the roof panel 18 covers the upper side of the framework member 16S. In other words, a closed cross-section profile section 16C is configured by a portion of the roof panel 18 and by the lower wall 16B, front wall 16M, and rear wall 16U of the roof reinforcement 56.

In such manner, so long as the vehicle body upper section structure 52 is able to maintain its rigidity, the roof reinforcement 56 may be structured with neither a reinforcement piece 16D nor an upper wall 16A. Not having either a reinforcement piece 16D or an upper wall 16A enables the weight of the roof reinforcement 56 to be further reduced.

In each of the above exemplary embodiments, the extensions 20 are provided with plural beads (the front bead 24F and the rear bead 24R). Configuration may be such that there is only one bead, but the effect of improving the flexural rigidity of the extension 20 is more pronounced when plural beads are provided. In particular, in the above exemplary embodiments, the front bead 24F improves flexural rigidity at the front side of the extension 20 and the rear bead 24R improves flexural rigidity at the rear side of the extension 20. Since the front bead 24F and the rear bead 24R are formed with vehicle front-rear direction symmetry to each other about the center line CL-2, there are no vehicle front-rear direction imbalances in the extension 20 at the portions with improved flexural rigidity.

In each of the above exemplary embodiments, there are adhering portions for adhering the extension 20 to the roof reinforcement 16 at a total of three locations: the adhering portion 30C at one location, and the adhering portions 30A, 30B at two respective locations. Although it is possible to adhere the extension 20 to the roof reinforcement 16 with just one adhering portion, providing plural adhering portions at plural locations enables the extension 20 to be adhered to the roof reinforcement 16 more firmly.

Further, the vehicle body upper section structure of each of the above exemplary embodiments has a structure in which bending of the extension 20 is suppressed, whereby a state in which the extension 20 is firmly adhered to the roof reinforcement 16 is easily maintained.

The roof reinforcement 16 has a linear profile in the vehicle width direction. This enables bending of the roof reinforcement 16 to be suppressed when load acts in the vehicle width direction. Since the roof reinforcement 16 is able to be formed with a linear profile, it is easier to form the roof reinforcement 16 than it is, for example, to form a structure that includes a bent or curved portion. The roof reinforcement 16 may, for example, be formed by extruding aluminum or the like, thereby enabling both reduced weight and high rigidity to be achieved. The roof reinforcement 16 may also be formed using fiber-reinforced plastic, thereby enabling weight to be even further reduced and a higher rigidity to be achieved. Due to the roof reinforcement 16 having a linear profile, the roof reinforcement 16 can be easily formed even in cases in which fiber-reinforced plastic is used.

The cross-section profile of the roof reinforcement 16, as taken along the vehicle front-rear direction, is uniform across the vehicle width direction regardless of position. Since there are no local changes in the shape of any portion of the roof reinforcement 16 in the vehicle width direction, with respect to this point too, bending of the roof reinforcement 16 is able to be suppressed even when, for example, load acts in the vehicle width direction.

What is claimed is:

1. A vehicle body upper section structure comprising:
a pair of roof side rails that are spaced apart in a vehicle width direction and that extend along a vehicle front-rear direction;
a roof reinforcement that extends along the vehicle width direction between the pair of roof side rails, the roof reinforcement including a framework member that extends in the vehicle width direction;
extensions that each join a vehicle vertical direction lower side of a respective one of the pair of roof side rails to a respective vehicle width direction inward side of the roof reinforcement; and
a beaded section that is provided at each extension, the beaded section projecting toward a lower side in the vehicle vertical direction and extending in the vehicle width direction such that a projection depth of the beaded section toward the lower side becomes deeper on progression from an inner side toward an outer side in the vehicle width direction, a location of the beaded section on an inner side in the vehicle width direction overlapping with the roof reinforcement and the framework member as viewed along the vehicle vertical direction,
wherein each extension includes a front wall portion and a rear wall portion,
a length in the vehicle vertical direction from an upper side of the front wall portion to a lower face of the extension, and a length in the vehicle vertical direction from an upper side of the rear wall portion to the lower face of the extension, become longer toward the outer side in the vehicle width direction, and
the front wall portion and the rear wall portion overlap with the roof reinforcement as viewed along the vehicle front-rear direction.

2. The vehicle body upper section structure of claim 1, wherein:
the beaded section includes:
a front bead positioned toward the front in the vehicle front-rear direction, and
a rear bead positioned toward the rear in the vehicle front-rear direction.

3. The vehicle body upper section structure of claim 2, wherein:
each extension includes an adhering portion for adhering the extension to the roof reinforcement at a location in front of the front bead in the vehicle front-rear direction, at a location to the rear of the rear bead in the vehicle front-rear direction, and at a location between the front bead and the rear bead in the vehicle front-rear direction.

4. The vehicle body upper section structure of claim 2, wherein the front wall portion and the rear wall portion face each other, and
the front bead and the rear bead are disposed between the front wall portion and the rear wall portion.

5. The vehicle body upper section structure of claim 1, wherein:
the roof reinforcement has a linear profile in the vehicle width direction; and
a cross-section profile of the roof reinforcement taken along the vehicle front-rear direction is uniform across the vehicle width direction regardless of position.

6. The vehicle body upper section structure of claim 1, wherein the roof reinforcement includes a closed cross-section profile section that has a rectangular shape in a cross-section taken along the vehicle front-rear direction.

7. The vehicle body upper section structure of claim 6, wherein a reinforcement piece is provided within the closed cross-section profile section, the reinforcement piece extending in the vehicle width direction and spanning between an upper wall and a lower wall of the closed cross-section profile section.

8. The vehicle body upper section structure of claim 1, wherein:
a cross-section profile of the roof reinforcement taken along the vehicle front-rear direction has an open cross-section profile that opens toward an upper side in the vehicle vertical direction; and
a roof panel that closes off the open cross-section profile is provided at the upper side of the roof reinforcement in the vehicle vertical direction.

* * * * *